United States Patent [19]
Janay et al.

[11] Patent Number: 6,061,694
[45] Date of Patent: May 9, 2000

[54] MESSAGE STRUCTURE

[75] Inventors: Gad Janay, Boca Raton, Fla.; Andre Cardinale, New York, N.Y.

[73] Assignee: Resqnet.com, Inc., New York, N.Y.

[21] Appl. No.: 08/988,747

[22] Filed: Dec. 11, 1997

[51] Int. Cl.$^7$ .................................................. G06F 17/30
[52] U.S. Cl. .......................... 707/507; 707/10; 709/201
[58] Field of Search ................ 707/507, 10; 382/283, 382/284; 709/201, 200; 380/24; 235/379; 379/88

[56] References Cited

U.S. PATENT DOCUMENTS

| | | | |
|---|---|---|---|
| 4,908,850 | 3/1990 | Masson et al. | 379/88 |
| 5,668,897 | 9/1997 | Stolfo | 382/283 |
| 5,677,955 | 10/1997 | Doggett et al. | 380/24 |
| 5,835,712 | 11/1998 | DuFresne | 707/10 |
| 5,862,325 | 1/1999 | Reed et al. | 709/201 |
| 5,892,909 | 4/1999 | Grasse et al. | 709/201 |

*Primary Examiner*—Ruay Lian Ho
*Assistant Examiner*—Thu Thao Havan
*Attorney, Agent, or Firm*—Kaplan & Gilman, LLP

[57] ABSTRACT

A technique of transmitting documents relating to, for example, financial transactions wherein information to be filled in using fill-ins or resolvers are transmitted separately so that it may be checked and processed independently of the remainder of the document.

8 Claims, 3 Drawing Sheets

FINANCIAL DOCUMENT

FIRST NAME __F1__      LAST NAME __F2__

ADDRESS __F3__

THIS DOCUMENT IS VALID FOR __R1__ FROM THE DATE HERE OF. GOALS MUST BE PAID FOR BY MEANS OF __F2__ ONLY.

GOODS TO BE SHIPPED NO LATER THAN __F4__

FINANCIAL DOCUMENT

FIRST NAME ___F1___   LAST NAME ___F2___

ADDRESS ___F3___

THIS DOCUMENT IS VALID FOR $R1$ FROM THE DATE HERE OF. GOALS MUST BE PAID FOR BY MEANS OF $F2$ ONLY.

GOODS TO BE SHIPPED NO LATER THAN $F4$

*FIG. 2*

F1 JOSEPH; F2 SMITH; F3 130 ELMSTREET; R1 30 DAYS; R2 BANKCHECK

*FIG. 3*

MESSAGE STRUCTURE

TECHNICAL FIELD

This invention relates to electronic communications, and more particularly, to an improved technique of exchanging information and generating documents based thereon over a data network.

BACKGROUND OF THE INVENTION

Documents and other information are exchanged in extremely large volumes over local area networks and wide area networks such as the Internet. Indeed, over the past several years, the popularity of the Internet has increased to the point where Internet access is as common in most office environments as is access to a telephone.

There are numerous algorithms in existence which perform error checking in order to ensure that documents are received uncorrupted in their conveyance through the network. These algorithms however, usually only check items such as spelling, parity, syntax, etc. Whether or not the substance of the documents is received correctly, or is even generated correctly when the information is input into the computer by the entity generating the documents, is a matter largely left to the discretion of the end users of the system. Any automated checking for substance is primitive and largely application specific.

The foregoing problem is particularly acute in the area of the electronic commerce such as banking, letters of credit, invoices, etc. In such applications, one small error can result in a large financial penalty to one or more parties to a transaction.

In view of the above, it can be appreciated that it would be desirable for an automated, efficient and standardized technique for ensuring the correctness of the substance of documents. Such technique should also be flexible in that it should allow for the checking of a variety of different types of documents, each of which may contain different types and values of information.

SUMMARY OF THE INVENTION

The above and other problems of the prior art are overcome and a technical advance is achieved in accordance with the present invention which relates to a technique of standardizing document transmission in order to minimize or, in some cases eliminate, the chance of substantive errors occurring. In accordance with the techniques of the present invention, a standardized document is utilized and the document contains "resolvers" and "fill-ins" in order to finalize its generation.

Fill-ins are place holders in the document where information is filled in by a user, in response to a question. For example, when the document is displayed on the screen of a computer, the fill-in generates a question for a user to answer, the answer being placed into the place holder in the document that is represented by the fill-in. Resolvers are place holders in the document where information is filled in from a source within a computer such as a database. Resolvers are typical of what is used in "mail merge" applications known to those of ordinary skill in the art.

A document is generated by a user and the resolvers and fill-ins are placed into the document as usual. When the documents are to be transmitted however, the resolvers and fill-ins are transmitted separately along with a mapping of where in the documents such resolvers and fill-ins should fit. When a document is received at the other side of a network, the receiving computer may then check all of the resolvers and fill-ins, with knowledge of the particular document, in order to ensure no inconsistencies and to maintain records of particular types and specific documents received. By keeping the resolvers and fill-ins separated from the remainder of the document, the receiving computer can determine which information was part of the template of the document and which is transaction specific, thus identifying which information needs to be checked and verified.

DETAILED DESCRIPTION OF THE PREFERRED EMBODIMENT

Figure 1:
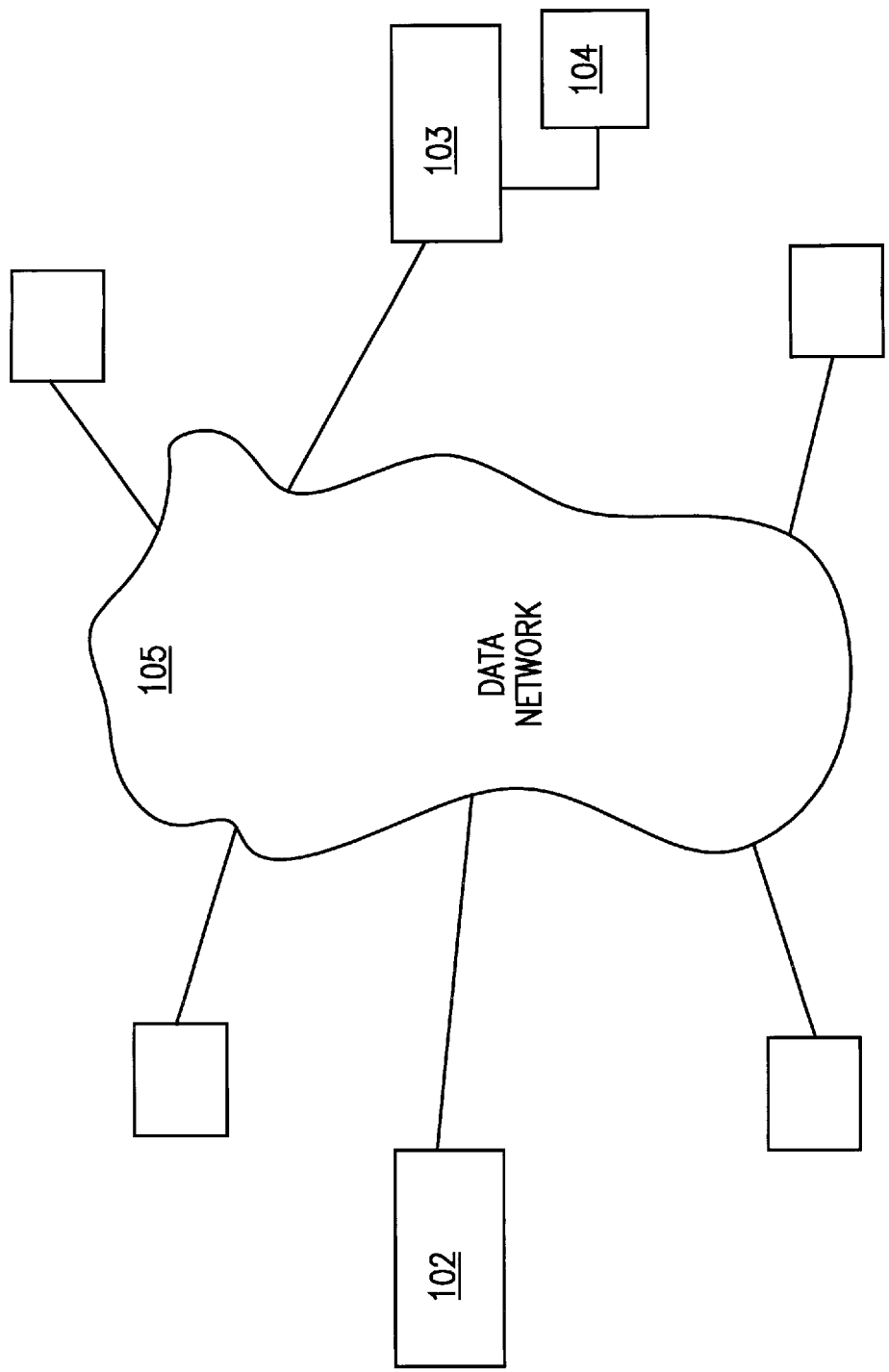

FIG. 1 shows a conceptual diagram of a data network 105 including two exemplary computers 102 and 103 along with a conceptual diagram of a printer 104 attached to computer 103. As shown in the diagram, there are also other representative computer devices attached to data network 105. Data network 105 may be a small local area network (LAN) or a wide area network such as the Internet.

In accordance with the inventive technique, it is desirable to transmit information pertaining to a particular transaction or document across network 105 from, for example, computer 102 to computer 103. The inventive technique is aimed at transmitting a document in a specified format, and for providing error checking and correction at the receiving computer 103.

FIG. 2 shows an exemplary screen of a hypothetical and simplified financial document to be generated at computer 103 based upon information entered into said computer 102. The exemplary document shown in FIG. 2 is a financial document which requires various terms including the name and address of a particular person, as well as information relating to the length of time for which the documents are valid, (R1) the method of payment (R2) as well as a shipping date for the goods. Items F1 through F4 represent "fill-ins" 1 through 4 and items R1 and R2 are denoted as resolvers 1 and 2, respectively.

Both fill-ins and resolvers are utilized in order to permit use of the system in a skeletal form wherein items which change from transaction to transaction are filled in as needed. A fill-in however, such as an individual's first name F1 in the exemplary system of FIG. 2, is an item of data which must be filled in from an outside source such as a user of the system. A resolver is an item which is filled in from an internal source such as a database. Specifically, the resolver holds a place in the document and the particular record from a database is filled in in a manner similar to the way a mail merge operation is accomplished when database is utilized to send a standard form letter to a large number of different people and have each letter separately addressed. Additionally, the terms represented by R1–R2 may also be generated based upon other information entered into different fields in the document to be generated. For example, if a particular field is filled in with a certain value, it may dictate that other fields are filled in with certain other values.

In the generation and transmission of financial documents, the information represented by F1 through F3 and by R1 through R2 may thus be filled in by a user or a computer at the entity generating the document. For example, if the financial document were a letter of credit, the information to be filled in and the resolvers would be generated by the requester or the issuing bank computer. The remainder of the document is a template comprising information that does not change from one document to the next.

In accordance with the techniques of the present invention, the fill-ins and resolvers are not merged into the document, nor is a document with all of such information immediately generated by a computer transmitting the document. Rather, the template document form is sent over a data network (e.g.; the Internet) and all of the fillers and resolvers are sent thereafter in a specified format. Moreover, the template document includes place holders for each resolver and fill-in, and the list of resolvers and fill-ins sent with the template document includes a table of pointers to indicate which resolvers and fill-in are to be inserted into each place in the document. The procedure is further clarified with respect to FIG. 3.

FIG. 3 shows a text string of a variety of information which maps directly into the fill-ins and resolvers of FIG. 2. As the data representing the information in FIG. 2 is sent, there are control characters which represent fill-ins and different control characters which represent resolvers. Additionally, the document in FIG. 2, when sent as a string of information, also denotes which fill-ins and resolvers are to be filled in and resolved in each location of the document. With reference to FIG. 3, the semicolon separates the particular fill-ins and resolvers which are to be filled in in each place. As a result, the document can be sent with its template form followed by the list of fill-ins and resolvers, where each fill-in and resolver contains enough information so that the receiving end can determine where in the document to place the information.

By transmitting the resolvers and fill-ins separately, several advantages are achieved. In one example, the fill-ins and resolvers can be checked for inconsistencies, inaccuracies, or forbidden terms. For example, a particular term present in one field may dictate the presence or absence of one or more terms in other fields. In this regard, see U.S. Pat. No. 5,530,961, assigned to the same assignee as the invention and incorporated herein by reference. Additionally, audit trails of particular information filled in can also be recorded, an operation which would be impossible if the filled in information were mixed in with the fixed text of the template document.

At the receiving computer 103, numerous formats are possible in order to provide for increased accuracy in the generated document at the receiving computer 103. For example, FIG. 3 shows one such format wherein the incoming string of data to be used for resolvers and fill-in is divided into the subsets of information separated by semicolons. Between each semi-colon is the particular resolver or fill-in number and the value which should be placed into that portion of the document. In general, the separation character need not be a semicolon and the format may be totally different. For example, all of the values to be filled in may be grouped together and separated by a control character, and separate information may be sent which instructs the receiving computer which fill-ins and resolvers should be placed at the which portions of the document. Importantly, the only requirement is that the string of information representing the values to be used for the fill-ins and resolvers may be mapped into the appropriate places in the document at the receiving computer 103.

Each fill-in or resolver may also be sent with information relating to the document type in which it is used, and the phrase type. For example, the template might read "in (fill-in 3) copies, manually signed." Fill-in 3 could include not only the substantive message, but a header indicating the document and phrase type. In the above example, the header might include such terms as "commercial invoices, CIF terms." The header transmitted with each term would thus identify the type of document and the type of phrase. This information can then be used by the receiving computer to check documents arriving and ensure no inconsistencies. For example, certain types of documents, or one or more particular phrases may be required or impermissible based upon the document type and phrase type in one or more resolvers or fill-ins.

Since the fill-ins and resolvers are separated, a rule based system can be utilized to check that information is correct in substance. For example, if a particular fill-in takes on a particular value, that may exclude or require other values in other places in the document. Therefore, receipt of a particular value in a particular fill-in would cause error checking to be performed on certain other resolvers or fill-ins. Additionally, the presence or absence of a particular value may dictate that either one or plural values may be utilized in another place in the document, either in a resolver or a fill-in.

It is also noted that the template need not be separately transmitted each time. Rather, a set of templates may be stored in memory at the receiving computer. The transmitting computer may send a code indicative of the document to be retrieved from memory and generated. The code is followed by the resolvers and fill-ins. Upon receipt of the document code, the template is retrieved from memory and populated with the appropriate resolvers and fill-ins. Another enhancement involves the receiving computer generating other documents automatically from the first document. Specifically, consider a first document which is a letter of credit. The document's fill-ins and resolvers may be used to generate other documents, such as a bill of lading, commercial invoice, etc. This requires that the receiving computer read the information from the first document and perform a table lookup to determine what other documents should be generated. Additionally, the other documents may be populated with one or more items from the first document, or with items that are dictated from information in the first document.

Various other modifications or additions are also possible and will be apparent to those of ordinary skill in the art.

What is claimed:

1. A method of generating documents comprising the steps of:

Presenting, to a user, on a computer screen, a document template with several blanks for information to be filled in by the user, the information to be filled in including resolvers and fill-ins;

separating the resolvers and fill-ins from the template;

transmitting, over a data network, a first set of transmitted information representative of the document template with resolvers and fill-ins missing;

transmitting, over a data network, a second set of transmitted information representative of resolvers and fill-ins along with an indication of where in said document said resolvers and fill-ins should be placed; and generating the entire document at receiving computer from said first and second sets of transmitted information, including said template, said resolvers, said fill-ins and said indication of wherein said document said resolvers and said fill-ins should be placed.

2. The method of claim 1 further comprising the steps of checking fill-ins and resolvers for inconsistencies at said receiving computer prior to filling them in and generating said document.

3. The method of claim 1 wherein said resolvers and fill-ins are sent from a banking institution.

4. A method of generating and transmitting a document comprising:

displaying a document template on a computer, said document template having place markers for resolvers and fill ins;

generating an information stream comprising first information representative of said document template, second information representative of said resolvers, third information representative of said fill ins, and fourth information representative of where in said document said fill ins and said resolvers should be placed;

transmitting said first, second, third and fourth information separately over a network; and utilizing said second, third, and fourth information at a receiving computer in order to ensure that the sent document was correctly generated and transmitted, and regenerating said document at said receiving computer.

5. A method of generating a document related to a transaction comprising the steps of:

storing, at a receiving computer, a plurality of document templates for documents to be generated;

transmitting, from a transmitting computer, a plurality of resolvers and fill-ins to be used to populate such document template;

transmitting, with each resolver and fill-in, identifying information indicative of a document type and phrase type associated with each fill-in; and populating the stored document and template with the resolvers and at a remote computer fill-ins.

6. The method of claim 5 further comprising the step of processing said identifying information to check said populated document for inconsistencies.

7. The method of claim 5 further comprising the step of analyzing said resolvers and fill-ins to determine if said populated document required other documents to be generated and generating such other documents.

8. The method of claim 7 wherein at least one of said other documents requires information received in said resolvers or fill-ins, and wherein said step of generating such other documents comprises filling in such other documents with said information received.

* * * * *